(12) United States Patent
He et al.

(10) Patent No.: US 11,329,521 B2
(45) Date of Patent: May 10, 2022

(54) FOREIGN OBJECT DETECTION APPARATUS AND METHOD FOR WIRELESS CHARGING SYSTEM, AND WIRELESS CHARGING SYSTEM

(71) Applicant: HUAWEI TECHNOLOGIES CO., LTD., Guangdong (CN)

(72) Inventors: Mou He, Fuzhou (CN); Wei Chen, Fuzhou (CN); Yongfa Zhu, Dongguan (CN); Shaojie Feng, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/209,484

(22) Filed: Mar. 23, 2021

(65) Prior Publication Data

US 2021/0210991 A1 Jul. 8, 2021

Related U.S. Application Data

(63) Continuation of application No. PCT/CN2020/081273, filed on Mar. 26, 2020.

(30) Foreign Application Priority Data

Aug. 1, 2019 (CN) .......................... 201910708968.2

(51) Int. Cl.
 *H02J 50/60* (2016.01)
 *H02J 50/10* (2016.01)
(52) U.S. Cl.
 CPC .............. *H02J 50/60* (2016.02); *H02J 50/10* (2016.02)

(58) Field of Classification Search
 CPC ..................................................... H02J 50/60
 USPC ......................................................... 320/108
 See application file for complete search history.

(56) References Cited

U.S. PATENT DOCUMENTS

| | | | | |
|---|---|---|---|---|
| 9,892,848 | B2* | 2/2018 | Omae | H01F 38/14 |
| 2013/0069441 | A1 | 3/2013 | Verghese et al. | |
| 2013/0241302 | A1* | 9/2013 | Miyamoto | H02J 7/025 |
| | | | | 307/104 |
| 2013/0307346 | A1 | 11/2013 | Arisawa et al. | |
| 2016/0336759 | A1 | 11/2016 | Yamamoto et al. | |
| 2017/0117740 | A1* | 4/2017 | Yamanishi | H02J 50/90 |
| 2017/0317536 | A1* | 11/2017 | Marson | G01V 3/10 |

(Continued)

FOREIGN PATENT DOCUMENTS

| | | |
|---|---|---|
| CN | 101304178 A | 11/2008 |
| CN | 105379056 A | 3/2016 |
| CN | 109143382 A | 1/2019 |

(Continued)

*Primary Examiner* — Edward Tso
*Assistant Examiner* — Ahmed H Omar
(74) *Attorney, Agent, or Firm* — Womble Bond Dickinson (US) LLP

(57) ABSTRACT

This application provides a wireless charging foreign object detection apparatus, applied to the field of wireless charging technologies. The detection apparatus includes: an excitation coil configured to provide a time-varying magnetic field, detection coils configured to detect a foreign object, and a processor configured to determine whether a foreign object exists. The detection coils may include two detection coils, or may include at least three detection coils. The at least three detection coils may be further configured to eliminate a detection blind spot.

20 Claims, 9 Drawing Sheets

(56) References Cited

U.S. PATENT DOCUMENTS

2018/0323659 A1* 11/2018 Maniktala ............... G01V 3/104
2021/0063599 A1* 3/2021 He ......................... G01V 3/081

FOREIGN PATENT DOCUMENTS

| CN | 109286248 A | 1/2019 |
| CN | 110571948 A | 12/2019 |

\* cited by examiner

FOREIGN OBJECT DETECTION APPARATUS AND METHOD FOR WIRELESS CHARGING SYSTEM, AND WIRELESS CHARGING SYSTEM

CROSS-REFERENCE TO RELATED APPLICATIONS

This application is a continuation of International Application No. PCT/CN2020/081273, filed on Mar. 26, 2020, which claims priority to Chinese Patent Application No. 201910708968.2, filed on Aug. 1, 2019. The disclosures of the aforementioned applications are hereby incorporated by reference in their entireties.

TECHNICAL FIELD

This application relates to the field of wireless charging technologies, and in particular, to a wireless charging foreign object detection apparatus, method, and system.

BACKGROUND

Among current wireless charging technologies, two technical solutions are most widely used: magnetic induction coupling and resonant coupling. Both of the two technical solutions are based on an electromagnetic induction principle. A high-frequency magnetic field is generated through a high-frequency alternating current of a transmitter coil, and energy is transmitted from the transmitter coil to a receiver coil through the high-frequency magnetic field, to implement wireless charging. In actual application, because metal has an eddy current effect in a time-varying magnetic field, an induced eddy current is generated inside the metal. In particular, a relatively large foreign object significantly reduces energy transmission efficiency of a wireless charging system.

In a current wireless charging system, an induced voltage method is used to detect a foreign object. A principle of the induced voltage method is to place a detection coil in the high-frequency magnetic field, and determine whether an induced voltage of the detection coil is abnormal, to determine whether the magnetic field is distorted, so as to determine whether a foreign object exists. Detection precision can be adjusted by adjusting a size of the detection coil, so that the induced voltage method is also applicable to detection of a small foreign object.

The induced voltage method has two insurmountable disadvantages. One is that magnetic fluxes that pass through corresponding detection coils need to be equal to ensure detection precision. Therefore, the detection coils need to be processed, and a detection system is relatively complex. Second, the detection coil has a detection blind spot. Currently, an effective method for eliminating the blind spot is to lay staggered multi-layer detection coils, but this significantly increases costs of the detection system.

SUMMARY

This application discloses a wireless charging foreign object detection apparatus and method that are based on a principle of an induced voltage method, to overcome a disadvantage in the prior art that a structure of a foreign object detection apparatus is complex and costs are relatively high for avoiding a detection blind spot.

According to a first aspect of this application, a foreign object detection apparatus for a wireless charging system is provided, where the detection apparatus includes an excitation coil, detection coils, and a processor.

The excitation coil is configured to provide a time-varying magnetic field.

The detection coils are configured to detect whether a foreign object exists between a wireless charging transmitting apparatus and a wireless charging receiving apparatus.

The detection coils include a first detection coil and a second detection coil, respective orthographic projections of the first detection coil, the second detection coil, and the excitation coil are all planar coils and are separated from each other on a same plane, the second detection coil is located between the first detection coil and the excitation coil, the first detection coil is located on an inner side of the second detection coil, and the excitation coil is located on an outer side of the second detection coil.

The processor is configured to: determine whether an induced voltage generated in the time-varying magnetic field by the first detection coil is equal to an induced voltage generated in the time-varying magnetic field by the second detection coil, and determine that a foreign object exists if two induced voltages are not equal.

In an embodiment, a target region in the time-varying magnetic field has substantial and even distribution in magnetic flux density, and the target region in the time-varying magnetic field is a region, in the time-varying magnetic field, in which the first detection coil and the second detection coil are located.

In an embodiment, the first detection coil and the second detection coil satisfy the following formula:

$$N1\frac{d\phi_1}{dt} = N2\frac{d\phi_2}{dt}$$

N1 is a quantity of turns of the first detection coil, and N2 is a quantity of turns of the second detection coil. $\phi_1$ is a magnetic flux that passes through one turn of the first detection coil, and $\phi_2$ is a magnetic flux that passes through one turn of the second detection coil. t is time.

$$\frac{d\phi_1}{dt}$$

is a time-varying rate of the magnetic flux that passes through one turn of the first detection coil, and $$\frac{d\phi_2}{dt}$$

is a time-varying rate of the magnetic flux that passes through one turn of the second detection coil. $d\phi_1$ is determined based on magnetic flux density of the time-varying magnetic field and a coil area of the first detection coil, and $d\phi_2$ is determined based on the magnetic flux density of the time-varying magnetic field and a coil area of the second detection coil.

In an embodiment, the first detection coil and the second detection coil satisfy the following formula:

$$N1S1\frac{\partial B}{\partial t} = N2S2\frac{\partial B}{\partial t}$$

N1 is the quantity of turns of the first detection coil, and N2 is the quantity of turns of the second detection coil. S1 is the coil area of the first detection coil, and S2 is the coil area of the second detection coil. B is the magnetic flux density, t is time, and $$\frac{\partial B}{\partial t}$$

is a time-varying rate of the magnetic flux density.

In an embodiment, a product of a quantity of turns of the first detection coil and an area encircled by the first detection coil is equal to a product of a quantity of turns of the second detection coil and an area encircled by the second detection coil.

In an embodiment, the first detection coil and the second detection coil have different quantities of turns. The first detection coil and the second detection coil have different quantities of turns because areas of regions encircled by the first detection coil and the second detection coil are different.

In an embodiment, both the first detection coil and the second detection coil are planar coils, and the first detection coil and the second detection coil are located on a same plane.

In an embodiment, the first detection coil and the second detection coil each include a plurality of turns, and the plurality of turns of each detection coil are coaxial.

In an embodiment, the foreign object detection apparatus for a wireless charging system may further include an alarm, where the alarm is configured to give an alarm when the processor determines that a foreign object exists.

According to a second aspect of this application, a foreign object detection apparatus for a wireless charging system is provided, where the detection apparatus includes an excitation coil, detection coils, and a processor.

The excitation coil is configured to provide a time-varying magnetic field.

The detection coils are configured to detect whether a foreign object exists between a wireless charging transmitting apparatus and a wireless charging receiving apparatus.

The detection coils include at least three detection coils, and orthographic projections of the at least three detection coils and the excitation coil are all planar coils and are separated from each other on a same plane.

Every two of the at least three detection coils form one coil pair, where each coil pair is configured to eliminate a detection blind spot.

The processor is configured to: determine whether induced voltages generated in the time-varying magnetic field by two coils in each coil pair are equal, and determine that a foreign object exists if the induced voltages are not equal.

In an embodiment, a target region in the time-varying magnetic field has substantial and even distribution in magnetic flux density, and the target region in the time-varying magnetic field is a region, in the time-varying magnetic field, in which the at least three detection coils are located.

In an embodiment, a product of an area encircled by one detection coil in each coil pair and a quantity of turns of the one detection coil is equal to a product of an area encircled by the other detection coil and a quantity of turns of the other detection coil.

In an embodiment, every two of the at least three detection coils have different quantities of turns. The at least three detection coils have different quantities of turns because areas of regions encircled by the at least three detection coils are different.

In an embodiment, the at least three detection coils are all planar coils and are located on a same plane.

In an embodiment, the at least three detection coils each include a plurality of turns, and the plurality of turns of each detection coil are coaxial.

In an embodiment, the foreign object detection apparatus for a wireless charging system may further include an alarm, where the alarm is configured to give an alarm when the processor determines that a foreign object exists.

According to a third aspect of this application, a wireless charging foreign object detection method is provided, including:

collecting, by a processor, an induced voltage generated, by a first detection coil, in a time-varying magnetic field generated by an excitation coil and an induced voltage generated, by a second detection coil, in the time-varying magnetic field generated by the excitation coil;

determining, by the processor, whether the induced voltage generated in the time-varying magnetic field by the first detection coil is equal to the induced voltage in the time-varying magnetic field generated by the second detection coil, and determining that a foreign object exists if the two voltages are not equal; and sending, by the processor, different signals based on different detection results.

In an embodiment, the method further includes:

when the processor determines that a foreign object exists, giving, by the processor, an alarm, or controlling an operation of a wireless charging system, and when the processor determines that a foreign object exists, disabling a normal operation of the wireless charging system.

According to a fourth aspect of this application, a wireless charging foreign object detection method is provided, including:

collecting, by a processor, induced voltages generated, by at least three detection coils, in a time-varying magnetic field generated by an excitation coil, where any two of the at least three detection coils form a coil pair;

determining, by the processor, whether the induced voltages generated in the time-varying magnetic field by two coils in the coil pair are equal, and determining that a foreign object exists if the induced voltages are not equal; and sending, by the processor, different signals based on a detection result.

In an embodiment, the method further includes:

when the processor determines that a foreign object exists, giving, by the processor, an alarm, or controlling an operation of a wireless charging system, and when the processor determines that a foreign object exists, disabling a normal operation of the wireless charging system.

According to a fifth aspect of this application, a wireless charging foreign object detection system is provided. The wireless charging foreign object detection system includes the wireless charging foreign object detection apparatus and a charging system according to the first aspect and the second aspect. The wireless charging foreign object detection apparatus is configured to detect whether a foreign object exists in the charging system.

The foreign object detection apparatus described in this application has an advantage that a simple coil structure can be used to implement foreign object detection in which a detection blind spot does not exist. This overcomes a disadvantage in the prior art that a structure of a foreign object detection apparatus is complex and costs are relatively high for avoiding a detection blind spot.

BRIEF DESCRIPTION OF DRAWINGS

To describe the technical solutions in the embodiments of this application more clearly, the following briefly describes the accompanying drawings for describing the embodiments. Certainly, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
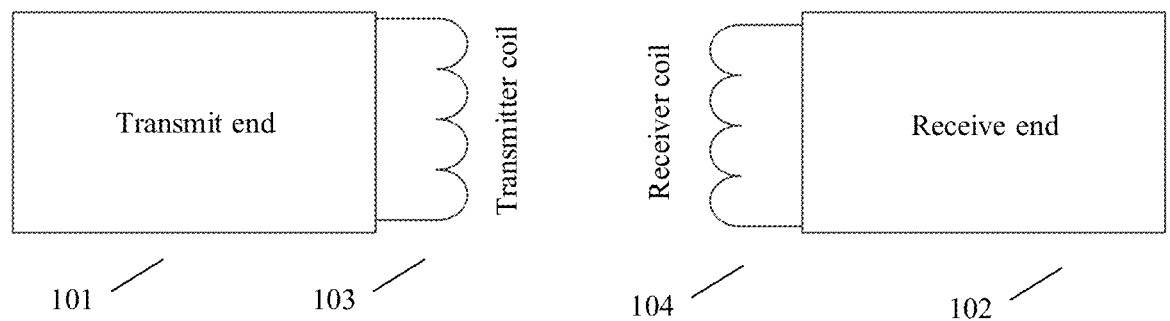
FIG. 1 is a schematic structural diagram of a wireless charging system according to an embodiment of this application.

This application is applied to a wireless charging scenario. Wireless charging, also referred to as wireless power transfer (WPT), refers to a technology in which electric energy is converted into relay energy (for example, electromagnetic field energy, light energy, and microwave energy) in other forms through a transmitting apparatus for transmission for a specific distance, and then the relay energy is converted into electric energy through a receiving apparatus. A wireless charging technology has made rapid progress in commercialization. For example, a wireless charging technology related to a consumer electronic product such as a smart terminal or an electric toothbrush, is relatively mature in application. In addition to the consumer electronic product, an electric vehicle field is also vigorously developing the wireless charging technology. When the wireless charging technology is gradually productized from lab to the market, one of the key problems that need to be resolved is foreign object detection.

Among current wireless charging technologies, two technical solutions are most widely used: magnetic induction coupling and resonant coupling. Both of the two technical solutions are based on an electromagnetic induction principle. A high-frequency magnetic field is generated through a high-frequency alternating current of a transmitter coil, and energy is transmitted from the transmitter coil to a receiver coil through the high-frequency magnetic field, to implement wireless charging. In actual application, because metal has an eddy current effect in a time-varying magnetic field, an induced eddy current is generated inside the metal. In particular, a relatively large foreign object significantly reduces energy transmission efficiency of a wireless charging system. In a high-power application scenario, an induced eddy current of a foreign object is quite large, and consequently a temperature greatly rises inside metal. If a foreign object exists in an operating area of the wireless charging system, in a severe case, irreversible damage may be caused to the wireless charging system or even a fire is caused. A wireless charging system of the electric vehicle has a high power level, and a foreign object is prone to be overheated. Therefore, a metal foreign object needs to be quickly and accurately detected. Especially in a high-power wireless charging application scenario, an efficient foreign object detection apparatus is required to prevent a disaster.

A wireless charging foreign object detection technology mainly includes a power difference method and an induced voltage method.

A principle of the power difference method is as follows: When a foreign object enters a wireless charging area, the foreign object induces an eddy current in a high-frequency magnetic field, and a loss is caused. A total transmit power of the wireless charging system remains unchanged, and an increase in loss caused by the metal eddy current causes a decrease in a receive power of the receiver coil, and causes a decrease in transmission efficiency. In a power difference comparison method, a difference between the receive power of the receiver coil and a transmit power of the transmitter coil is determined, to determine whether a foreign object exists.

The power difference comparison method is applicable to a case in which a loss caused by a foreign object eddy current is relatively large. If a loss caused by a foreign object eddy current can be ignored compared with a loss of a system transmit power, the method is difficult to take effect, and a small-volume foreign object may not be detected.

A principle of the induced voltage method is to place a detection coil in the high-frequency magnetic field, and determine whether an induced voltage of the detection coil is abnormal, to determine whether the magnetic field is distorted, so as to determine whether a foreign object exists. Detection precision can be adjusted by adjusting a size of the detection coil, so that the induced voltage method is also applicable to detection of a small foreign object.

The induced voltage method has two insurmountable disadvantages. One is that magnetic fluxes that pass through corresponding detection coils need to be equal to ensure detection precision. Therefore, the detection coils need to be processed, and a detection system is relatively complex. Second, the detection coil has a detection blind spot. Currently, an effective method for eliminating the blind spot is to lay staggered multi-layer detection coils, but this significantly increases costs of the detection system.

Embodiments of this application provide a wireless charging foreign object detection apparatus, method, and system based on the principle of the induced voltage method, to resolve a prior-art problem that exists when a foreign object is detected using the induced voltage method.

To make the objectives, technical solutions, and advantages of this application clearer, the following further describes this application in detail with reference to the accompanying drawings.

FIG. 1 is a schematic structural diagram of a wireless charging system. The wireless charging system includes a transmit end 101 and a receive end 102. The transmit end 101 is connected to a transmitter coil 103, and the receive end 102 is connected to a receiver coil 104. The transmit end 101 is configured to provide electric energy for the receive end 102, or charge the receive end 102. In an embodiment, the transmitter coil 103 provides an alternating current, so that the transmitter coil 103 generates a time-varying magnetic field. The receiver coil 104 undergoes electromagnetic induction in the time-varying magnetic field generated by the transmitter coil 103, so that an induced current is produced in the receiver coil 104.

If a foreign object exists in the wireless charging system, because the foreign object has an eddy current effect in the magnetic field generated by the transmitter coil, transmission efficiency of the wireless charging system is reduced.

Figure 2:
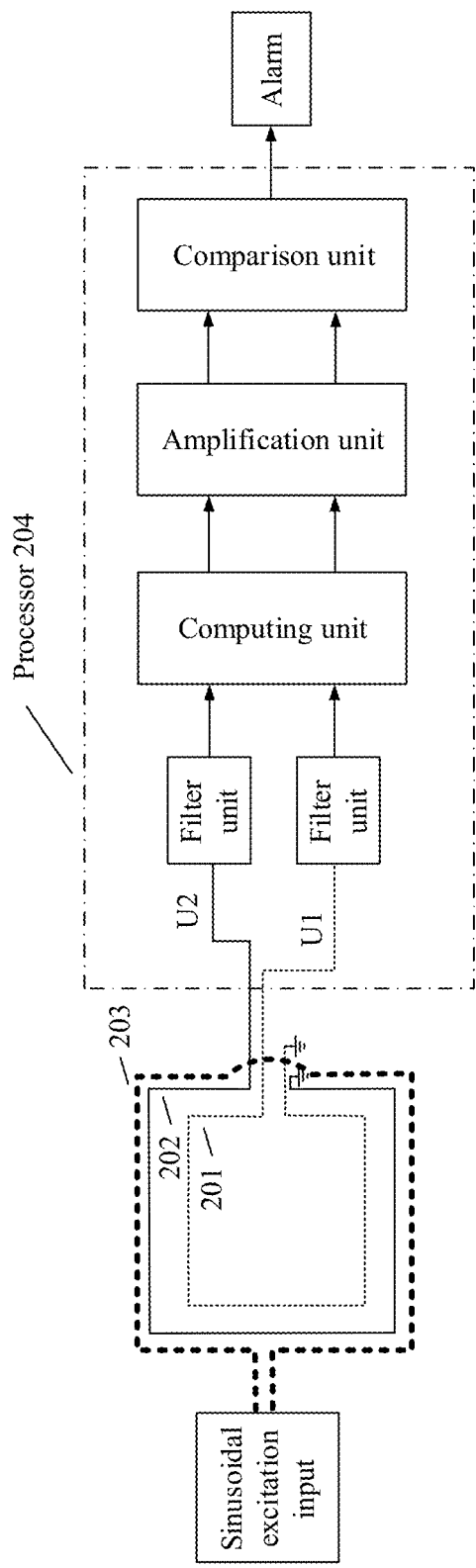
FIG. 2 is a schematic diagram of a foreign object detection apparatus including two detection coils according to an embodiment of this application.
Figure 3:
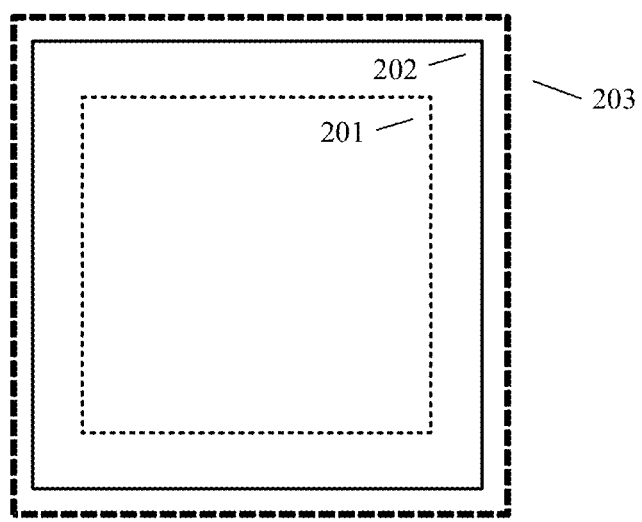
FIG. 3 is a schematic diagram of a detection unit including two detection coils according to an embodiment of this application.

To simply and efficiently detect the foreign object in the wireless charging system, Embodiment 1 of this application provides a foreign object detection apparatus. FIG. 2 is a schematic structural diagram of the foreign object detection apparatus according to an embodiment of this application. The foreign object detection apparatus includes a first detection coil 201, a second detection coil 202, an excitation coil 203, and a processor 204. The first detection coil 201, the second detection coil 202, and the excitation coil 203 jointly form a detection unit. As shown in FIG. 3, the detection unit includes the first detection coil 201, the second detection coil 202, and the excitation coil 203.

In an embodiment, orthographic projections of the first detection coil 201, the second detection coil 202, and the excitation coil 203 are all planar coils and are located on a same plane. In an embodiment, the first detection coil 201, the second detection coil 202, and the excitation coil 203 are located on a same plane. In another embodiment, the first detection coil 201, the second detection coil 202, and the excitation coil 203 are not located on a same plane. In other words, distances of at least two coils in the first detection coil 201, the second detection coil 202, and the excitation coil 203 from the projection plane are not equal.

In an embodiment, both the first detection coil 201 and the second detection coil 202 are planar coils and are located on a same plane. The first detection coil and the second detection coil each include a plurality of turns, and the plurality of turns of each detection coil are coaxial. A shape of the coil may be a rectangle, a circle, or a polygon. This is not limited in this embodiment of this application. The first detection coil 201 is located on an inner side of the second detection coil 202, and both the first detection coil 201 and the second detection coil 202 are located on an inner side of the excitation coil 203. In other words, the second detection coil 202 is located between the first detection coil 201 and the excitation coil 203. The first detection coil 201 is located on an inner side of the second detection coil 202, and the excitation coil 203 is located on an outer side of the second detection coil 202. In other words, the first detection coil 201 is completely encircled by the second detection coil 202, and the first detection coil 201 and the second detection coil 202 are completely encircled by the excitation coils 203. The second detection coil 202 and the first detection coil 201 on the inner side are separated from each other, and the second detection coil 202 on the outer side of the first detection coil 201 is separated from the excitation coil 203.

The excitation coil 203 is connected to a sinusoidal excitation input current, and is configured to provide a time-varying magnetic field. The time-varying magnetic field is substantial and uniform for the first detection coil 201 and the second detection coil 202. The meaning of "substantial and uniform" should be based on the understanding of a person skilled in the art, for example, may be understood as that a magnetic field strength fluctuates around 5%.

It should be noted that the excitation coil that is used to generate a time-varying magnetic field is a magnetic field excitation source of an independently disposed detection coil. The detection coil includes the first detection coil and the second detection coil. This independently disposed magnetic field excitation source can eliminate system interference in the wireless charging system, to further ensure that the detection coil can accurately detect a foreign object. In an embodiment, the excitation coil 203 may alternatively be a transmitter coil in the wireless charging system. In this way, costs can be further reduced, and the detection coil can be applied to a plurality of wireless charging systems, to conveniently and quickly detect a foreign object.

The first detection coil 201 and the second detection coil 202 are configured to detect whether a foreign object exists between a wireless charging transmitting apparatus and a wireless charging receiving apparatus. The excitation coil uses a current at a frequency different from an operating frequency of the wireless charging system. For example, the excitation coil uses a 6.78 MHz high-frequency sinusoidal current that is different from an 85 kHz frequency of the wireless charging system, to facilitate filtering of the processor.

The first detection coil 201 and the second detection coil 202 satisfy the following formula:

$$N1 \frac{d\phi_1}{dt} = N2 \frac{d\phi_2}{dt}$$

N1 is a quantity of turns of the first detection coil 201, and N2 is a quantity of turns of the second detection coil 202. $\phi_1$ is a magnetic flux that passes through one turn of the first detection coil 201, and $\phi_2$ is a magnetic flux that passes through one turn of the second detection coil 202. t is time $$\frac{d\phi_1}{dt}$$

is a time-varying rate of the magnetic flux that passes through one turn of the first detection coil 201, and $$\frac{d\phi_2}{dt}$$

is a time-varying rate of the magnetic flux that passes through one turn of the second detection coil 202. $d\phi_1$ is determined based on magnetic flux density of the time-varying magnetic field and an area of a region encircled by any turn of the first detection coil 201, and $d\phi_2$ is determined based on the magnetic flux density of the time-varying magnetic field and an area of a region encircled by any turn of the second detection coil 202.

The first detection coil 201 and the second detection coil 202 are placed in the uniform time-varying magnetic field on a plane on which the two coils are located. It can be learned from a Faraday's law of electromagnetic induction that a high-frequency time-varying magnetic field induces an electromotive force E in a closed loop:

$$E = -NS\frac{\partial B}{\partial t}$$

Because a direction of the induced electromotive force depends on a loop integral of a magnetic field that passes through the closed loop, coils in different winding directions induce electromotive forces having different directions. Magnetic flux density B of the high-frequency magnetic field generated by the excitation coil is approximately uniform in the two detection coils. Therefore, at a specific frequency, time-based changes of the magnetic flux density B in the two detection coils are approximately the same, and a value of the induced electromotive force E depends only on an area S of a time-varying magnetic field that passes through the closed loop and a quantity N of turns in the closed loop.

For each detection coil, an induced electromotive force of each detection coil is related to a quantity of turns of the detection coil and a magnetic flux change rate of any turn of the detection coil. For example, the induced electromotive force of the first detection coil is related to a quantity of turns of the first detection coil and a magnetic flux change rate of each turn of the first detection coil.

A magnetic flux of each turn is related to magnetic flux density of the time-varying magnetic field and an area of a region encircled by the turn. For example, a magnetic flux of the first turn is related to the magnetic flux density of the time-varying magnetic field and an area of a region encircled by the first turn.

The first detection coil and the second detection coil have different quantities of turns and different areas. Directions of induced electromotive forces of the two coils can be the same or opposite by adjusting winding directions of the coils. In a normal case in which no foreign object exists, a quantity of turns and/or an area of a region encircled by the coil are/is adjusted. The first detection coil 201 with a smaller area has a larger quantity of turns, and the second detection coil 202 with a larger area has a smaller quantity of turns. When a product of a quantity of turns of the first detection coil 201 and an area encircled by the first detection coil 201 is equal to a product of a quantity of turns of the second detection coil 202 and an area encircled by the second detection coil 202, an induced electromotive force generated in the time-varying magnetic field by the first detection coil 201 is equal to an induced electromotive force generated in the time-varying magnetic field by the second detection coil 202. The first detection coil 201 and the second detection coil 202 further satisfy the following formula:

$$N1S1\frac{\partial B}{\partial t} = N2S2\frac{\partial B}{\partial t}$$

N1 is the quantity of turns of the first detection coil, and N2 is the quantity of turns of the second detection coil. S1 is an area of a region encircled by any turn of the first detection coil, and S2 is an area of a region encircled by any turn of the second detection coil. B is the magnetic flux density, t is time, and $$\frac{\partial B}{\partial t}$$

is a time-varying rate of the magnetic flux density. Magnetic flux density of the high-frequency magnetic field generated by the excitation coil is approximately uniform in the first detection coil and the second detection coil. Therefore, under alternating current excitation of a same frequency, time-based changes $$\frac{\partial B}{\partial t}$$

of the magnetic flux density in the first detection coil and the second detection coil are approximately the same. In other words, a product of a quantity of turns of the first detection coil and an area is equal to a product of a quantity of turns of the second detection coil and an area.

In an embodiment, the first detection coil 201 and the second detection coil 202 are in a same winding direction, and induced electromotive forces generated in the time-varying magnetic field are of a same value and in a same direction. In another embodiment, the first detection coil 201 and the second detection coil 202 are in opposite winding directions, and induced electromotive forces generated in the time-varying magnetic field are of a same value and in opposite directions.

A foreign object may distort an induced magnetic field. For example, a metal foreign object may also generate an induced electromotive force in the time-varying magnetic field, and the electromotive force generates a closed loop current, namely, an eddy current, inside the metal foreign object. The eddy current may generate a magnetic field, which is referred to as an eddy current counter magnetic field because a direction of the magnetic field generated by the eddy current is opposite to a direction of the original time-varying magnetic field. An organism foreign object also distorts the time-varying magnetic field.

In an embodiment, an eddy current counter magnetic field generated by a metal foreign object generates an induced electromotive force in the first detection coil and the second detection coil. A voltage of the induced electromotive force in the first detection coil is U1, and a voltage of the induced electromotive force in the second detection coil is U2.

When the metal foreign object enters the first detection coil in the wireless charging system, because an eddy current counter magnetic field that passes through the first detection coil with a smaller area inevitably passes through the second detection coil encircling the first detection coil, the following is obtained:

$$U1 = \Delta U \times N1$$

$$U2 = \Delta U \times N2$$

In the formula, $\Delta U$ is a voltage generated by one turn under impact of the eddy current counter magnetic field. The one turn is any closed turn that can completely encircle the eddy current counter magnetic field generated by the foreign object. The magnetic field generated by the foreign object inside the first detection coil is completely encircled by the first detection coil, and also completely encircled by the second detection coil. N1 and N2 are a quantity of turns of the first detection coil and a quantity of turns of the second detection coil, respectively. Because the quantity N1 of turns of the first detection coil is not equal to the quantity N2 of turns of the second detection coil, the voltage U1 induced in the first detection coil is not equal to the voltage U2 induced in the second detection coil.

Similarly, when the metal enters an area sandwiched by the first detection coil and the second detection coil, because the area is outside the first detection coil and inside the second detection coil, it may be approximately considered that the eddy current counter magnetic field passes through only the second detection coil and does not pass through the first detection coil. Then the following is obtained:

$$U1=0$$

$$U2=\Delta U \times N2$$

That is, the voltage U1 induced in the first detection coil is not equal to the voltage U2 induced in the second detection coil.

In an embodiment, when the metal foreign object falls into a detection region inside the second detection coil with a larger area, voltages of the first detection coil and the second detection coil are different, while the voltages of the first detection coil and the second detection coil are the same when no metal foreign object exists. Therefore, existence of a metal foreign object may be determined based on whether the voltages of the first detection coil and the second detection coil are the same.

The processor 204 is configured to: determine whether the induced voltage U1 in the time-varying magnetic field generated by the first detection coil is equal to the induced voltage U2 generated in the time-varying magnetic field by the second detection coil, and determine, based on whether U1 and U2 are equal, whether a foreign object exists.

It may be understood that the induced voltage of the first detection coil may be not equal to the induced voltage of the second detection coil when no foreign object exists, but voltages output after being processed by the processor are equal. A processing process of the processor is linear. Therefore, if a foreign object exists, the induced voltages of the two coils are not equal to the induced voltages when no foreign object exists, and voltages of the two coils output after linear processing are not equal to the induced voltages when no foreign object exists. In this way, induced voltages output by the processor are equal when no foreign object exists, and induced voltages output by the processor are not equal when a foreign object exists.

The processor 204 may include a filter unit, a computing unit, an amplification unit, and a comparison unit. The filter unit is configured to select an excitation frequency component. The computing unit is configured to compute a voltage signal. The amplification unit is configured to amplify a signal that is output after the computation to a distinguishable value. The comparison unit is configured to compare a previous-stage output with a specified threshold, and output different signals such as a high-level signal and a low-level signal based on a comparison result. It may be understood that an internal structure of the processor is not limited, and any device, module, or unit that can implement voltage signal processing and compare a value relationship between U1 and U2 may be the processor described in this application.

In an embodiment, the processor 204 collects voltages U1 and U2 of the coils, and uses U1 and U2 as signal sources. U1 and U2 are in opposite directions and of a same value. After the signals are filtered and amplified, undergo addition, and the like, a sum of U1 and U2 is zero, and the processor 204 outputs a signal A, which indicates that no foreign object exists in the wireless charging system. When the voltages U1 and U2 are in opposite directions and of different values, a sum of U1 and U2 is not zero, and the processor 204 outputs a signal B, which indicates that a foreign object exists in the wireless charging system. The signal A and the signal B may be significantly identifiable digital signals or significantly identifiable analog signals that can be identified by another part of the system. For example, the signal A is a low level signal or a zero level signal, and the signal B is a high level signal. In an embodiment, an operation of the wireless charging system may be further controlled, to disable a normal operation of the wireless charging system by identifying the signal B, so as to prevent an accident. The foreign object detection apparatus may further include an alarm that is used by the processor 204 to give an alarm when the processor 204 determines that a foreign object exists. Different physical actions are performed by identifying different signals, to remind a user to pay attention to existence of a foreign object. When no foreign object enters, the signal A is identified by the alarm, and the alarm does not respond. When a foreign object enters, the signal B is identified by the alarm, and the alarm makes a physical response. For example, if an alarm includes an LED light, the LED light is on; or if an alarm includes a buzzer, the buzzer buzzes. In this way, the user is prompted that a metal foreign object enters.

In another embodiment, the processor 204 collects voltages U1 and U2 of the coils, and uses U1 and U2 as signal sources. U1 and U2 are in a same direction and of a same value. After the signals are filtered and amplified, undergo subtraction, and the like, a difference between U1 and U2 is zero, and the processor 204 outputs a signal A, which indicates that no foreign object exists in the wireless charging system. When the voltages U1 and U2 are in a same direction and of different values, a difference between U1 and U2 is not zero, and the processor 204 outputs a signal B, which indicates that a foreign object exists in the wireless charging system. The signal A and the signal B may be significantly identifiable digital signals or significantly identifiable analog signals that can be identified by another part of the system. For example, the signal A is a low level signal or a zero level signal, and the signal B is a high level signal. In an embodiment, an operation of the wireless charging system may be further controlled, to disable a normal operation of the wireless charging system by identifying the signal B, so as to prevent an accident. The foreign object detection apparatus may further include an alarm that is used by the processor 204 to give an alarm when the processor 204 determines that a foreign object exists. Different physical actions are performed by identifying different signals, to remind a user to pay attention to existence of a foreign object. When no foreign object enters, the signal A is identified by the alarm, and the alarm does not respond. When a foreign object enters, the signal B is identified by the alarm, and the alarm makes a physical response. For example, if an alarm includes an LED light, the LED light is on; or if an alarm includes a buzzer, the buzzer buzzes. In this way, the user is prompted that a metal foreign object enters.

It should be understood that an area of a region encircled by each turn of each detection coil is substantially the same. When each detection coil is placed in the time-varying magnetic field, if the time-varying magnetic field is a uniform magnetic field, a variation of a magnetic flux, in the time-varying magnetic field, of any turn of each detection coil is the same. It is assumed that areas of turns of each detection coil are the same, but the time-varying magnetic field is a non-uniform magnetic field, or the time-varying magnetic field is a uniform magnetic field, but areas of regions encircled by the turns of each detection coil are different, (for example, variations of magnetic fluxes, in the time-varying magnetic field, of the first turn and the last turn may be different due to different positions of the coils). In this case, a variation of a magnetic flux, in the time-varying magnetic field, of any turn of each detection coil is different to some extent from that in a case in which the time-varying magnetic field is a uniform magnetic field. However, a spacing between turns of each coil is relatively small, and in practice, a magnetic field generated by the excitation coil may be approximately considered to be uniform, and an area of a region encircled by each turn may be considered to be substantially the same. Therefore, a variation of a magnetic flux, in the time-varying magnetic field, of any turn of each detection coil is relatively small. In other words, it may be considered that a variation of a magnetic flux, in the time-varying magnetic field, of any turn of each detection coil is the same. During actual computation, an induced voltage of each detection coil may be computed by using an average value of variations of magnetic fluxes, in the time-varying magnetic field, of turns of each detection coil. Alternatively, an induced voltage of each coil may be computed by using a variation of a magnetic flux, in the time-varying magnetic field, of any turn of each detection coil. It may be understood that, any manner in which an induced voltage can be computed by using a variation of a magnetic flux, in the time-varying magnetic field, of each turn of each detection coil is applicable to this embodiment of this application.

The following describes a method embodiment of this application.

Figure 4:
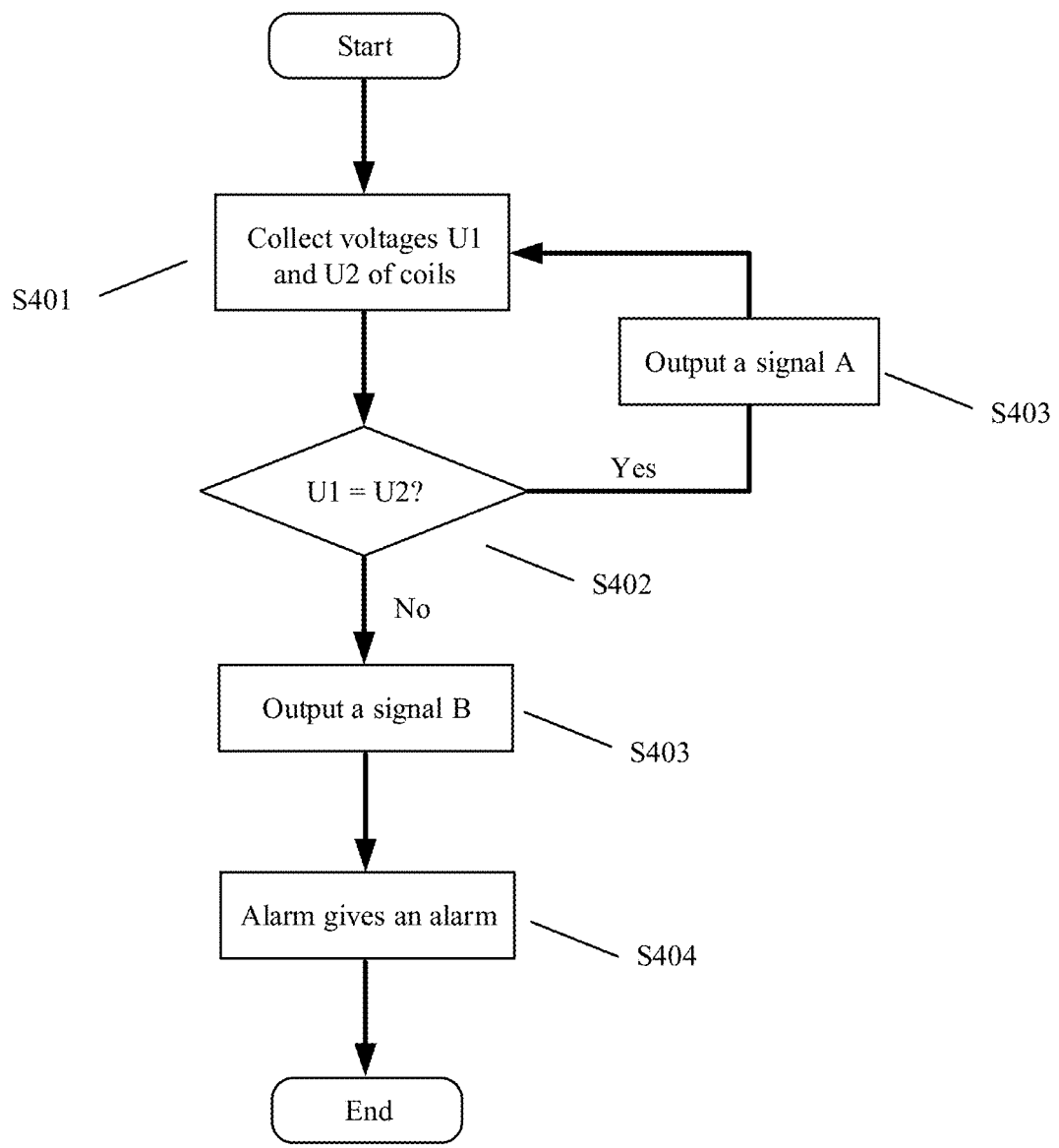
FIG. 4 is a schematic diagram of operation operations of a foreign object detection method according to an embodiment of this application.

Embodiment 2 of this application provides a foreign object detection method. FIG. 4 is a schematic diagram of operation operations of the foreign object detection method. The method includes the following operation operations:

S401: A processor collects a voltage U1 of a first detection coil and a voltage U2 of a second detection coil.

S402: The processor determines whether the voltage U1 of the first detection coil is equal to the voltage U2 of the second detection coil, and if U1 and U2 are not equal, determines that a foreign object exists.

S403: The processor sends different signals based on a detection result. If the voltage of the first detection coil is equal to the voltage of the second detection coil, the processor outputs a signal A; or if the voltage of the first detection coil is not equal to the voltage of the second detection coil, the processor outputs a signal B.

In an embodiment, S404 may be further included:

An alarm does not respond when identifying the signal A, and gives an alarm when identifying the signal B. For example, if an alarm includes an LED light, the LED light is on; or if an alarm includes a buzzer, the buzzer buzzes. Alternatively, an operation of a wireless charging system is controlled, to disable a normal operation of the wireless charging system when the signal B is identified, so as to prevent an accident.

When an area of a foreign object in a system in which the wireless charging foreign object detection apparatus in Embodiment 1 operates is relatively large, a detection blind spot exists in the foregoing foreign object detection apparatus. Embodiment 3 of this application provides a foreign object detection apparatus, to implement blind spot detection.

A detection apparatus including the first detection coil 201 and the second detection coil 202 in Embodiment 1 is used as an example to describe a detection blind spot. It can be learned from the following formula:

$$E = -NS\frac{\partial B}{\partial t}$$

If no foreign object exists, induced voltages |E1| and |E2| of the two detection coils are of a same value. Therefore, (N1×S1)=(N2×S2).

Figure 5:
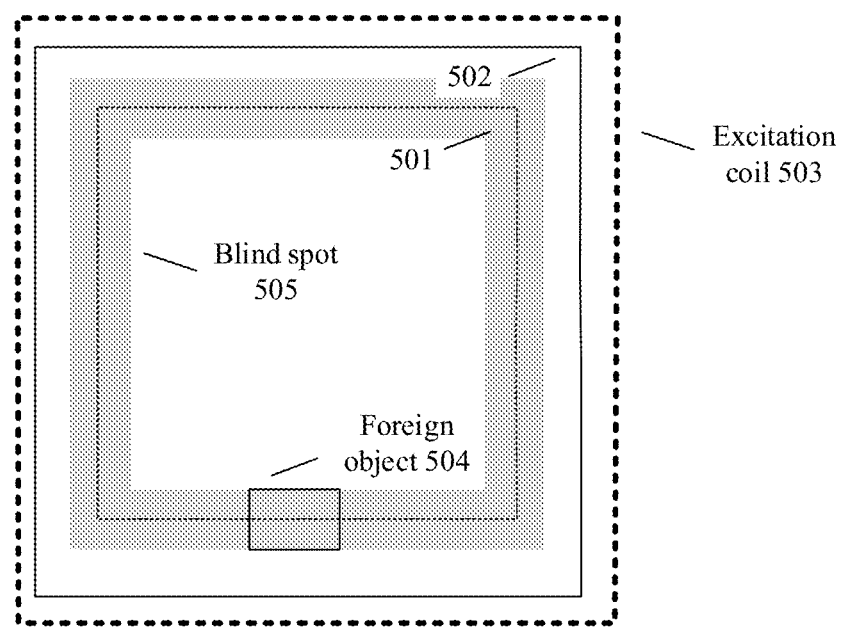
FIG. 5 is a schematic diagram of a detection blind spot according to an embodiment of this application.

FIG. 5 is a schematic diagram of a detection blind spot. When a metal foreign object 504 crosses a first detection coil 501, a part of an eddy current counter magnetic field generated by the metal foreign object 504 in a magnetic field generated by an excitation coil 503 falls inside the first detection coil 501. In this case, an induced voltage generated on one turn of the first detection coil 501 is ΔU1, and an induced voltage generated on one turn of a second detection coil 502 is ΔU1'. A part of the eddy current counter magnetic field falls outside the first detection coil 501, and the part does not generate an induced voltage in the first detection coil 501. In this case, an induced voltage generated on one turn of the second detection coil 502 is ΔU2. An induced voltage generated in the first detection coil by an eddy current magnetic field of the foreign object is actually an induced voltage generated by a part of an eddy current magnetic field, of the foreign object, that falls inside the first coil 501, and an induced voltage generated in the second detection coil by an eddy current magnetic field of the foreign object is actually an induced voltage generated by an eddy current magnetic field, of the foreign object, that completely falls inside the second detection coil. Induced voltages of the two coils are respectively as follows:

$$U1 = N_1 \times \Delta U1$$

$$U2 = N_2 \times (\Delta U1' + \Delta U2)$$

Because $S_2 > S_1$, $N_2 < N_1$. ΔU1, ΔU1', and ΔU2 are all generated by the eddy current counter magnetic field. A high-frequency magnetic field generated by the excitation coil has approximately uniform magnetic flux density in the two detection coils. Therefore, at a specific frequency, in a magnetic field, in the two detection coils, in which time-based changes of magnetic flux density are approximately the same, a value of an induced electromotive force of one turn depends only on an area of a time-varying magnetic field that passes through a closed loop. Because a part of the foreign object located inside the first coil is also located inside the second coil, an induced voltage, generated on one turn of the first coil, by the part of the foreign object is equal to an induced voltage, generated on one turn of the first coils, by the part of the foreign object. In other words, |ΔU1'|=|ΔU1|. Then, |(ΔU1'+ΔU2)|>|ΔU1|. It is assumed that a foreign object crosses the N2 coil and makes ΔU1 and ΔU2 satisfy the following formula:

$$|N2 \times (\Delta U1' \Delta U2)| = |N1 \times \Delta U1|$$

In this case, after the foreign object enters, induced voltages of the two coils are still of a same value, and existence of the foreign object does not cause a processor to generate a signal different from a signal generated when no foreign object exists. Therefore, an area in which the foreign object may exist is a detection blind spot 505, as shown by a shadow part in FIG. 5.

It should be understood that the foregoing content is merely a description for ease of understanding detection. In actual application, a magnetic field generated by a foreign object is not necessarily uniform, and computation of induced electromotive forces generated by the first detection coil and the second detection coil in a magnetic field generated by the foreign object is more complex. However, for the detection, it may be determined that when the foreign object crosses the first detection coil and is divided into two parts by the first coils, there is a relatively high probability of a detection blind spot.

Figure 6:
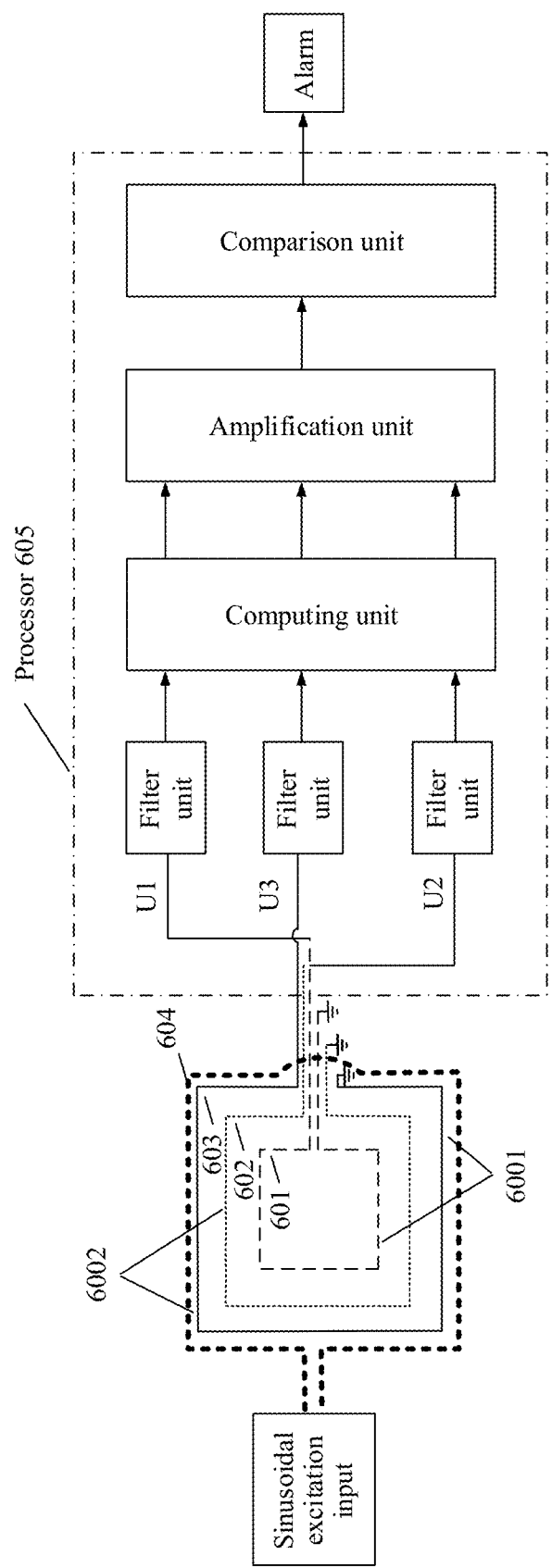
FIG. 6 is a schematic diagram of a foreign object detection apparatus including three detection coils according to an embodiment of this application.
Figure 7:
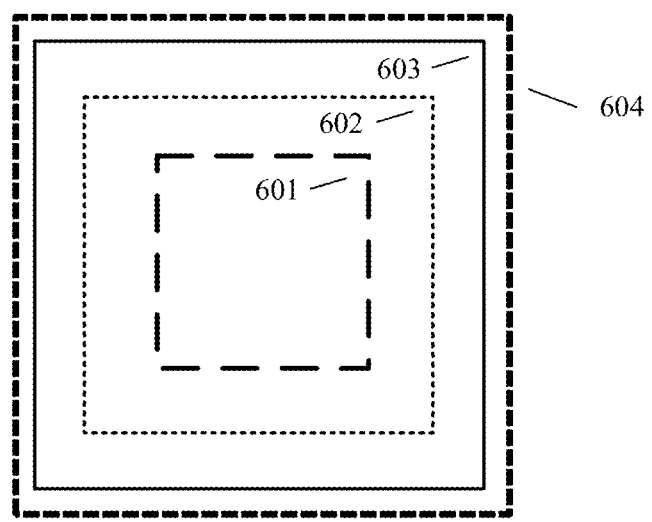
FIG. 7 is a schematic diagram of a detection unit including three detection coils according to an embodiment of this application.

FIG. 6 is a schematic structural diagram of a foreign object detection apparatus according to Embodiment 3 of this application. The foreign object detection apparatus includes a first detection coil 601, a second detection coil 602, a third detection coil 603, an excitation coil 604, and a processor 605. The first detection coil, the second detection coil, the third detection coil, and the excitation coil jointly form a detection unit. As shown in FIG. 7, the detection unit includes the first detection coil 601, the second detection coil 602, the third detection coil 603, and the excitation coil 604. It may be understood that the foreign object detection apparatus in this embodiment may further be a foreign object detection apparatus including more than three detection coils, and a construction principle and a detection principle of this foreign object detection apparatus is similar to those in an embodiment of the foreign object detection apparatus including three detection coils. Details are not described herein.

In an embodiment, orthographic projections of the first detection coil 601, the second detection coil 602, and the excitation coil 603 are all planar coils and are located on a same plane. In an embodiment, the first detection coil 601, the second detection coil 602, and the excitation coil 603 are located on a same plane. In another embodiment, the first detection coil 601, the second detection coil 602, and the excitation coil 603 are not located on a same plane. In other words, distances of at least two coils in the first detection coil 601, the second detection coil 602, and the excitation coil 603 from the projection plane are not equal.

In an embodiment, the first detection coil 601, the second detection coil 602, and the third detection coil 603 are all planar coils and are located on a same plane. The first detection coil 601, the second detection coil 602, and the third detection coil 603 each include a plurality of turns, and the plurality of turns of each detection coil are coaxial. A shape of the coil may be a rectangle, a circle, or a polygon. This is not limited in this embodiment of this application. The first detection coil 601 is located on an inner side of the second detection coil 602, and the second detection coil 602 is located on an inner side of the third detection coil 603. In other words, the first detection coil 601 is the innermost, the second detection coil 602 is in the middle, and the third detection coil 603 is an outermost coil. The first detection coil 601, the second detection coil 602, and the third detection coil 603 are all located on an inner side of the excitation coil 604. In other words, the first detection coil 601 is completely encircled by the second detection coil 602, the second detection coil 602 is completely encircled by the third detection coil 603, and the first detection coil 601, the second detection coil 602, and the third detection coil 603 are completely encircled by the excitation coils 604. The first detection coil on the inner side, the second detection coil in the middle, and the third detection coil on the outer side are separated from each other.

The excitation coil 604 is connected to a sinusoidal excitation input current, and is configured to provide a time-varying magnetic field. The time-varying magnetic field is substantial and uniform for the first detection coil 601, the second detection coil 602, and the third detection coil 603. The meaning of "substantial and uniform" should be based on the understanding of a person skilled in the art, for example, may be understood as that a magnetic field strength fluctuates around 5%.

It should be noted that the excitation coil, as a magnetic field excitation source of an independently disposed detection coil, is used to generate a time-varying magnetic field. The detection coil includes the first detection coil, the second detection coil, and the third detection coil. This independently disposed magnetic field excitation source can eliminate system interference in a wireless charging system, to further ensure that the detection coil can accurately detect a foreign object. In an embodiment, the excitation coil 604 may further be a transmitter coil in the wireless charging system. In this way, costs can be further reduced, and the detection coil can be applied to a plurality of wireless charging systems, to conveniently and quickly detect a foreign object.

The first detection coil 601 and the third detection coil 603 form a first coil pair 6001, and the second detection coil 602 and the third detection coil 603 form a second coil pair 6002. The first coil pair and the second coil pair are combined to detect whether a foreign object exists between a wireless charging transmitting apparatus and a wireless charging receiving apparatus, and eliminate a detection blind spot. The excitation coil uses a current at a frequency different from an operating frequency of the wireless charging system. For example, the excitation coil uses a 6.78 MHz high-frequency sinusoidal current that is different from an 85 kHz frequency of the wireless charging system, to facilitate filtering of the processor.

The first detection coil 601 and the third detection coil 603 satisfy the following formula:

$$N1\frac{d\phi_1}{dt} = N3\frac{d\phi_3}{dt}$$

The second detection coil 602 and the third detection coil 603 satisfy the following formula:

$$N2\frac{d\phi_2}{dt} = N3\frac{d\phi_3}{dt}$$

N1 is a quantity of turns of the first detection coil 601, N2 is a quantity of turns of the second detection coil 602, and N3 is a quantity of turns of the third detection coil 603. $\phi_1$ is a magnetic flux that passes through one turn of the first detection coil 601, $\phi_2$ is a magnetic flux that passes through one turn of the second detection coil 602, and $\phi_3$ is a magnetic flux that passes through one turn of the second detection coil 603. t is time $$\frac{d\phi_1}{dt}$$

is a time-varying rate of the magnetic flux that passes through one turn of the first detection coil 601, $$\frac{d\phi_2}{dt}$$

is a time-varying rate of the magnetic flux that passes through one turn of the second detection coil 602, and $$\frac{d\phi_3}{dt}$$

a time-varying rate of the magnetic flux that passes through one turn of the third detection coil 603. $d\phi_1$ is determined based on magnetic flux density of the time-varying magnetic field and an area of a region encircled by any turn of the first detection coil 601, $d\phi_2$ is determined based on the magnetic flux density of the time-varying magnetic field and an area of a region encircled by any turn of the second detection coil 602, and $d\phi_3$ is determined based on the magnetic flux density of the time-varying magnetic field and an area of a region encircled by any turn of the second detection coil 603.

The first detection coil 601, the second detection coil 602, and the third detection coil 603 are placed in a uniform time-varying magnetic field on a plane on which the two coils 601 and 602 are located. It can be learned from a Faraday's law of electromagnetic induction that a high-frequency time-varying magnetic field induces an electromotive force E in a closed loop:

$$E = -NS\frac{\partial B}{\partial t}$$

Because a direction of the induced electromotive force depends on a loop integral of a magnetic field that passes through the closed loop, coils in different winding directions induce electromotive forces having different directions. Magnetic flux density B of the high-frequency magnetic field generated by the excitation coil is approximately uniform in the three detection coils. Therefore, at a specific frequency, time-based changes of the magnetic flux density B in the three detection coils are approximately the same, and a value of the induced electromotive force E depends only on an area S of a time-varying magnetic field that passes through the closed loop and a quantity N of turns in the closed loop.

For each detection coil, an induced electromotive force of each detection coil is related to a quantity of turns of the detection coil and a magnetic flux change rate of any turn of the detection coil. For example, the induced electromotive force of the first detection coil is related to a quantity of turns of the first detection coil and a magnetic flux change rate of each turn of the first detection coil.

A magnetic flux of each turn is related to magnetic flux density of the time-varying magnetic field and an area of a region encircled by the turn. For example, a magnetic flux of the first turn is related to the magnetic flux density of the time-varying magnetic field and an area of a region encircled by the first turn.

The first detection coil 601, the second detection coil 602, and the third detection coil 603 have different quantities of turns and different areas. Directions of induced electromotive forces of the three coils can be adjusted by adjusting winding directions of the coils. In a normal case in which no foreign object exists, a quantity of turns and/or an area of a region encircled by the coil are/is adjusted. In the first coil pair 6001, the first detection coil 601 with a smaller area has a larger quantity of turns, and the third detection coil 603 with a larger area has a smaller quantity of turns. In the second coil pair 6002, the second detection coil 602 with a smaller area has a larger quantity of turns, and the third detection coil 603 with a larger area has a smaller quantity of turns. When a product of a quantity of turns of the first detection coil 601 and an area encircled by the first detection coil 601 is equal to a product of a quantity of turns of the third detection coil 603 and an area encircled by the third detection coil 603, an induced electromotive force generated in the time-varying magnetic field by the first detection coil 601 is equal to an induced electromotive force generated in the time-varying magnetic field by the third detection coil 603. When a product of a quantity of turns of the second detection coil 602 and an area encircled by the second detection coil 602 is equal to a product of a quantity of turns of the third detection coil 603 and an area encircled by the third detection coil 603, an induced electromotive force generated in the time-varying magnetic field by the second detection coil 602 is equal to an induced electromotive force generated in the time-varying magnetic field by the third detection coil 603. The first detection coil 601 and the third detection coil 603 further satisfy the following formula:

$$N1S1\frac{\partial B}{\partial t} = N3S3\frac{\partial B}{\partial t}$$

The second detection coil 602 and the third detection coil 603 further satisfy the following formula:

$$N2S2\frac{\partial B}{\partial t} = N3S3\frac{\partial B}{\partial t}$$

N1 is the quantity of turns of the first detection coil, N2 is the quantity of turns of the second detection coil, and N3 is the quantity of turns of the third coil. S1 is an area of a region encircled by any turn of the first detection coil, S2 is an area of a region encircled by any turn of the second detection coil, and S3 is an area of a region encircled by any turn of the third detection coil. B is the magnetic flux density, t is time, and $$\frac{\partial B}{\partial t}$$

is a time-varying rate or me magnetic flux density. Magnetic flux density of the high-frequency magnetic field generated by the excitation coil is approximately uniform in the first detection coil, the second detection coil, and the third detection coil. Therefore, under alternating current excitation of a same frequency, time-based changes $$\frac{\partial B}{\partial t}$$

or me magnetic flux density in the first detection coil, the second detection coil, and the third detection coil are approximately the same. In other words, a product of a quantity of turns of the first detection coil and an area is equal to a product of a quantity of turns of the third detection coil and an area, and a product of a quantity of turns of the second detection coil and an area is equal to a product of a quantity of turns of the third detection coil and an area. A foreign object may distort an induced magnetic field. For example, a metal foreign object may also generate an induced electromotive force in the time-varying magnetic field, and the electromotive force generates a closed loop current, namely, an eddy current, inside the metal foreign object. The eddy current may generate a magnetic field, which is referred to as an eddy current counter magnetic field because a direction of the magnetic field generated by the eddy current is opposite to a direction of the original time-varying magnetic field. An organism foreign object also distorts the time-varying magnetic field.

In an embodiment, an eddy current counter magnetic field generated by a metal foreign object generates an induced electromotive force in the first detection coil, the second detection coil, and the third detection coil. A voltage of the induced electromotive force in the first detection coil is U1, a voltage of the induced electromotive force in the second detection coil is U2, and a voltage of the induced electromotive force in the third detection coil is U3.

When the metal foreign object enters the first detection coil in the wireless charging system, because an eddy current counter magnetic field that passes through the first detection coil with a smaller area inevitably passes through the third detection coil encircling the first detection coil, the following is obtained:

$$U1 = \Delta U \times N1$$

$$U3 = \Delta U \times N3$$

Similarly, because an eddy current counter magnetic field that passes through the second detection coil with a smaller area inevitably passes through the third detection coil encircling the second detection coil, the following is obtained:

$$U2 = \Delta U \times N2$$

$$U3 = \Delta U \times N3$$

In the formula, $\Delta U$ is a voltage generated by one turn under impact of the eddy current counter magnetic field. The one turn is any closed turn that can completely encircle the eddy current counter magnetic field generated by the foreign object. The magnetic field generated by the foreign object inside the first detection coil is completely encircled by the first detection coil, and also completely encircled by the third detection coil. The magnetic field generated by the foreign object inside the second detection coil is completely encircled by the second detection coil, and also completely encircled by the third detection coil. N1, N2, and N3 are a quantity of turns of the first detection coil, a quantity of turns of the second detection coil, and a quantity of turns of the third detection coil, respectively. Because the quantity N1 of turns of the first detection coil is not equal to the quantity N3 of turns of the third detection coil, the voltage U1 induced in the first detection coil is not equal to the voltage U3 induced in the third detection coil. Because the quantity N2 of turns of the second detection coil is not equal to the quantity N3 of turns of the third detection coil, the voltage U2 induced in the second detection coil is not equal to the voltage U3 induced in the third detection coil.

When the metal enters an area sandwiched by the first detection coil and the third detection coil, because the area is outside the first detection coil and inside the third detection coil, it may be approximately considered that the eddy current counter magnetic field passes through only the third detection coil and does not pass through the first detection coil. Then the following is obtained:

$$U1 = 0$$

$$U3 = \Delta U \times N3$$

That is, the voltage U1 induced in the first detection coil is not equal to the voltage U3 induced in the third detection coil.

When the metal enters an area sandwiched by the second detection coil and the third detection coil, because the area is outside the second detection coil and inside the third detection coil, it may be approximately considered that the eddy current counter magnetic field passes through only the third detection coil and does not pass through the second detection coil. Then the following is obtained:

$$U2 = 0$$

$$U3 = \Delta U \times N3$$

That is, the voltage U2 induced in the second detection coil is not equal to the voltage U3 induced in the third detection coil.

In an embodiment, when the metal foreign object falls into a detection region inside the third detection coil with a larger area, voltages of the first detection coil and the third detection coil are different, while the voltages of the first detection coil and the third detection coil are the same when no metal foreign object exists. Voltages of the second detection coil and the third detection coil are of a same value when no metal foreign object exists, and are different when a metal foreign object exists. Therefore, existence of a metal foreign object may be determined based on whether the voltages of the first detection coil and the third detection coil are the same or whether the voltages of the second detection coil and the third detection coil are the same.

A detection blind spot of the first coil pair including the first detection coil and the third detection coil is located near the first coil, a detection blind spot of the second coil pair including the second detection coil and the third detection coil is located near the second coil. The detection blind spot of the first coil pair and the detection blind spot of the second coil pair do not overlap. Therefore, a combination of the first coil pair and the second coil pair can effectively eliminate a detection blind spot generated when there are only two detection coils.

The processor 605 is configured to: determine whether the induced voltage U1 generated in the time-varying magnetic field by the first detection coil in the first coil pair is equal to the induced voltage U3 generated in the time-varying magnetic field by the third detection coil; or determine whether the induced voltage U2 generated in the time-varying magnetic field by the second detection coil in the second coil pair is equal to the induced voltage U3 generated in the time-varying magnetic field by the third detection coil; and determine, based on a result, whether a foreign object exists. If two induced voltages in either of the first coil pair and the second coil pair are different, it is determined that a foreign object exists. The processor 605 may include a filter unit, a computing unit, an amplification unit, and a comparison unit. The filter unit is configured to select an excitation frequency component. The computing unit is configured to compute a voltage signal. The amplification unit is configured to amplify a signal that is output after the computation to a distinguishable value. The comparison unit is configured to compare a previous-stage output with a specified threshold, and output different signals such as a high-level signal and a low-level signal based on a comparison result. It may be understood that an internal structure of the processor is not limited, and any device, module, or unit that can implement voltage signal processing and compare a value relationship between U1 and U3 or a value relationship between U2 and U3 may be the processor described in this application.

In an embodiment, the processor 605 collects voltages U1 and U3 of the coils, and uses U1 and U3 as signal sources. U1 and U3 are in opposite directions and of a same value. After the signals are filtered, amplified, undergo addition, and the like, a sum of U1 and U3 is zero, and the processor 605 outputs a signal A, which indicates that no foreign object exists in the wireless charging system. When the voltages U1 and U3 are of different values, a sum of U1 and U3 is not zero, and the processor 605 outputs a signal B, which indicates that a foreign object exists in the wireless charging system. The signal A and the signal B may be significantly identifiable digital signals or significantly identifiable analog signals that can be identified by another part of the system. For example, the signal A is a low level signal or a zero level signal, and the signal B is a high level signal. In an embodiment, an operation of the wireless charging system may be further controlled, to disable a normal operation of the wireless charging system by identifying the signal B, so as to prevent an accident. The foreign object detection apparatus may further include an alarm that is used by the processor 605 to give an alarm when the processor 204 determines that a foreign object exists. Different physical actions are performed by identifying different signals, to remind a user to pay attention to existence of a foreign object. When no foreign object enters, the signal A is identified by the alarm, and the alarm does not respond. When a foreign object enters, the signal B is identified by the alarm, and the alarm makes a physical response. For example, if an alarm includes an LED light, the LED light is on; or if an alarm includes a buzzer, the buzzer buzzes. In this way, the user is prompted that a metal foreign object enters.

In another embodiment, the processor 605 collects voltages U2 and U3 of the coils, and uses U2 and U3 as signal sources. U2 and U3 are in a same direction and of a same value. After the signals are filtered, amplified, undergo subtraction, and the like, a difference between U2 and U3 is zero, and the processor 605 outputs a signal A, which indicates that no foreign object exists in the wireless charging system. When the voltages U2 and U3 are of different values, a difference between U2 and U3 is not zero, and the processor 605 outputs a signal B, which indicates that a foreign object exists in the wireless charging system. The signal A and the signal B may be significantly identifiable digital signals or significantly identifiable analog signals that can be identified by another part of the system. For example, the signal A is a low level signal or a zero level signal, and the signal B is a high level signal. In an embodiment, an operation of the wireless charging system may be further controlled, to disable a normal operation of the wireless charging system by identifying the signal B, so as to prevent an accident. The foreign object detection apparatus may further include an alarm that is used by the processor 605 to give an alarm when the processor 204 determines that a foreign object exists. Different physical actions are performed by identifying different signals, to remind a user to pay attention to existence of a foreign object. When no foreign object enters, the signal A is identified by the alarm, and the alarm does not respond. When a foreign object enters, the signal B is identified by the alarm, and the alarm makes a physical response. For example, if an alarm includes an LED light, the LED light is on; or if an alarm includes a buzzer, the buzzer buzzes. In this way, the user is prompted that a metal foreign object enters.

Therefore, if a metal foreign object exists but is not located in a detection blind spot of a coil pair, either of the two coil pairs triggers the alarm to give an alarm. If the foreign object is located in a detection blind spot of a coil pair, the other coil pair triggers the alarm to give an alarm. Therefore, if any coil pair detects a foreign object, it can be determined that a foreign object exists in the wireless charging system.

It should be understood that an area of a region encircled by each turn of each detection coil is substantially the same. When each detection coil is placed in the time-varying magnetic field, if the time-varying magnetic field is a uniform magnetic field, a variation of a magnetic flux, in the time-varying magnetic field, of any turn of each detection coil is the same. It is assumed that areas of turns of each detection coil are the same, but the time-varying magnetic field is a non-uniform magnetic field, or the time-varying magnetic field is a uniform magnetic field, but areas of regions encircled by the turns of each detection coil are different, (for example, variations of magnetic fluxes, in the time-varying magnetic field, of the first turn and last turn may be different due to different positions of the coils). In this case, a variation of a magnetic flux, in the time-varying magnetic field, of any turn of each detection coil is different to some extent from that in a case in which the time-varying magnetic field is a uniform magnetic field. However, a spacing between turns of each coil is relatively small, and in practice, a magnetic field generated by the excitation coil may be approximately considered to be uniform, and an area of a region encircled by each turn may be considered to be substantially the same. Therefore, a variation of a magnetic flux, in the time-varying magnetic field, of any turn of each detection coil is relatively small. In other words, it may be considered that a variation of a magnetic flux, in the time-varying magnetic field, of any turn of each detection coil is the same. During actual computation, an induced voltage of each detection coil may be computed by using an average value of variations of magnetic fluxes, in the time-varying magnetic field, of turns of each detection coil. Alternatively, an induced voltage of each coil may be computed by using a variation of a magnetic flux, in the time-varying magnetic field, of any turn of each detection coil. It may be understood that, any manner in which an induced voltage can be computed by using a variation of a magnetic flux, in the time-varying magnetic field, of each turn of each detection coil is applicable to this embodiment of this application.

Figure 8:
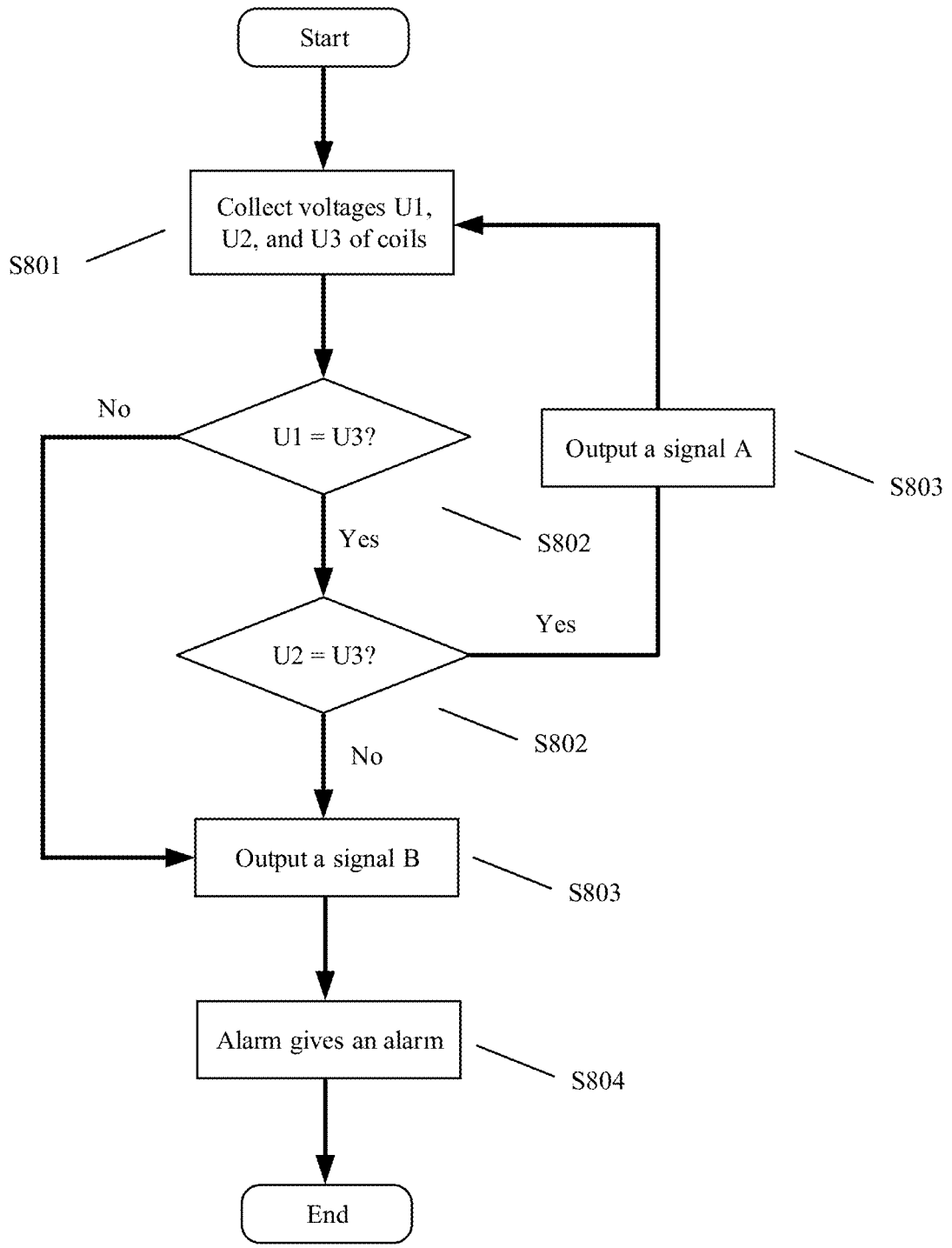
FIG. 8 is a schematic diagram of operation operations of another foreign object detection method according to an embodiment of this application.

Embodiment 4 of this application provides a foreign object detection method. FIG. 8 is a schematic diagram of operations of the foreign object detection method. The method includes the following operations:

S801: A processor collects a voltage U1 of a first detection coil, a voltage U2 of a second detection coil, and a voltage U3 of a third detection coil.

S802: The processor determines whether the voltage U1 of the first detection coil is equal to the voltage U3 of the third detection coil; and if U1 and U3 are not equal, determines that a foreign object exists; or if U1 and U3 are equal, determines whether the voltage U2 of the second detection coil is equal to the voltage U3 of the third detection coil, and if U2 and U3 are not equal, determines that a foreign object exists.

S803: The processor sends different signals based on a detection result. If the voltage U1 of the first detection coil is equal to the voltage U3 of the third detection coil, and the voltage U2 of the second detection coil is equal to the voltage U3 of the third detection coil, the processor outputs a signal A. If the voltage U1 of the first detection coil is not equal to the voltage U3 of the third detection coil, or the voltage U2 of the second detection coil is not equal to the voltage U3 of the third detection coil, the processor outputs a signal B.

In an embodiment, S804 may be further included:

An alarm does not respond when identifying the signal A, and gives an alarm when identifying the signal B. For example, if an alarm includes an LED light, the LED light is on; or if an alarm includes a buzzer, the buzzer buzzes. Alternatively, an operation of a wireless charging system is controlled, to disable a normal operation of the wireless charging system when the signal B is identified, so as to prevent an accident.

It may be understood that the foreign object detection apparatus in this embodiment may further be a foreign object detection apparatus including more than three detection coils, and a construction principle and a detection principle of this foreign object detection apparatus is similar to those in an embodiment of the foreign object detection apparatus including three detection coils. The embodiment is the possible implementation described in the foregoing embodiment in which the first detection coil is the innermost, the second detection coil is in the middle, and the third detection coil is an outermost coil. Details are not described herein again.

Figure 9:
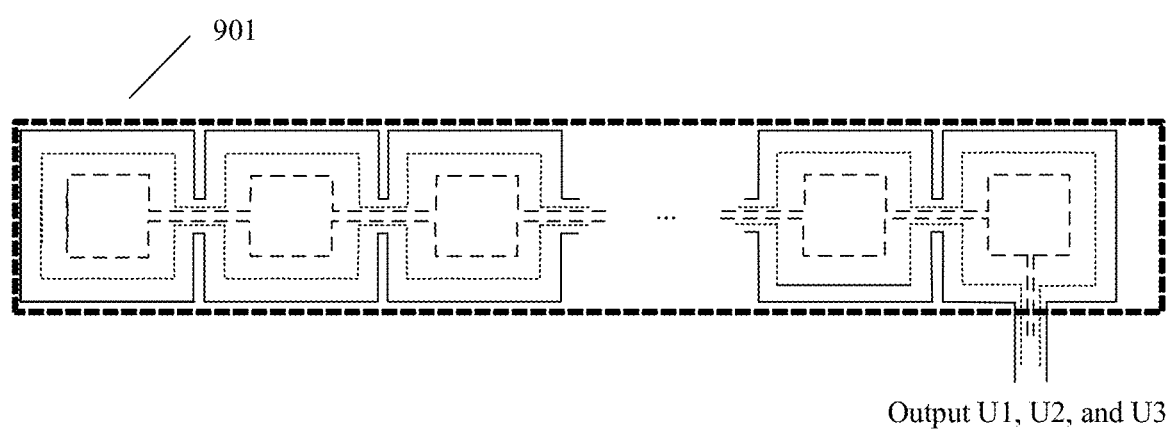
FIG. 9 is a schematic structural diagram of a detection apparatus with detection coils connecting in series according to an embodiment of this application.

Embodiment 5 of this application provides a foreign object detection apparatus. As shown in FIG. 9, the foreign object detection apparatus is obtained after N detection coils 901 of the foreign object detection apparatus in Embodiment 3 are connected in series, to expand a detection area. A specific embodiment thereof is similar to that in Embodiment 2, and details are not described herein again.

Embodiment 6 of this application provides a foreign object detection system. The system includes the foreign object detection apparatus described in Embodiment 1, Embodiment 3, or Embodiment 5, and a charging system. The wireless charging foreign object detection apparatus is configured to detect whether a foreign object exists in the charging system. Details are not described herein again.

The foregoing descriptions are merely preferable embodiments of this application, but are not intended to limit this application. Although the embodiments of this application are disclosed above, the embodiments are not intended to limit this application. By using the method and the technical content disclosed above, any person of ordinary skill in the art can make a plurality of possible changes and modifications on the technical solutions of this application, or amend the technical solutions thereof to be embodiments with equal effects through equivalent variations without departing from the protection scope of the technical solutions of this application. Therefore, any simple amendments, equivalent variations, and modifications made on the above embodiments according to the technical essence of this application without departing from the content of the technical solutions of this application shall fall within the protection scope of the technical solutions of this application.

What is claimed is:

1. A foreign object detection apparatus for a wireless charging system, comprising:
   an excitation coil configured to provide a time-varying magnetic field;
   a plurality of detection coils configured to detect whether a foreign object exists between a wireless charging transmitting apparatus and a wireless charging receiving apparatus, wherein the detection coils comprise a first detection coil and a second detection coil, wherein respective orthographic projections of the first detection coil, the second detection coil, and the excitation coil are all planar coils and are separated from each other on a same plane, wherein the second detection coil is located between the first detection coil and the excitation coil, the first detection coil is located on an inner side of the second detection coil, and the excitation coil is located on an outer side of the second detection coil; and
   a processor configured to: determine whether a first induced voltage generated in the time-varying magnetic field by the first detection coil is equal to a second induced voltage generated in the time-varying magnetic field by the second detection coil, and determine that a foreign object exists if the first and second induced voltages are not equal.

2. The detection apparatus according to claim 1, wherein a target region in the time-varying magnetic field, in which the first and second detection coils are located, includes a substantially even distribution in magnetic flux density.

3. The detection apparatus according to claim 1, wherein a product of a quantity of turns of the first detection coil and an area encircled by the first detection coil is equal to a product of a quantity of turns of the second detection coil and an area encircled by the second detection coil.

4. The detection apparatus according to claim 1, wherein the first detection coil and the second detection coil have different quantities of turns.

5. The detection apparatus according to claim 1, wherein both the first detection coil and the second detection coil are planar coils, and the first detection coil and the second detection coil are located on a same plane.

6. The detection apparatus according to claim 1, wherein the first detection coil and the second detection coil each comprise a plurality of turns that are coaxial.

7. The detection apparatus according to claim 1, further comprising an alarm configured to generate an alarm when the processor determines that a foreign object exists.

8. A foreign object detection apparatus for a wireless charging system, comprising:
   an excitation coil configured to provide a time-varying magnetic field;
   a plurality of detection coils configured to detect whether a foreign object exists between a wireless charging transmitting apparatus and a wireless charging receiving apparatus, wherein the detection coils comprise at least three detection coils, and orthographic projections of the at least three detection coils and the excitation coil are all planar coils that are separated from each other on a same plane, wherein every two of the at least three detection coils form one coil pair, and wherein each coil pair is configured to eliminate a detection blind spot; and
   a processor configured to: determine whether induced voltages generated in the time-varying magnetic field by two coils in each coil pair are equal, and determine that a foreign object exists if the induced voltages are not equal.

9. The detection apparatus according to claim 8, wherein a target region in the time-varying magnetic field, in which the at least three detection coils are located, includes a substantially even distribution in magnetic flux density.

10. The detection apparatus according to claim 8, wherein a product of an area encircled by one detection coil in each coil pair and a quantity of turns of the one detection coil is equal to a product of an area encircled by the other detection coil in the coil pair and a quantity of turns of the other detection coil.

11. The detection apparatus according to claim 8, wherein every two of the at least three detection coils have different quantities of turns.

12. The detection apparatus according to claim 8, wherein the at least three detection coils are all planar coils located on a same plane.

13. The detection apparatus according to claim 8, wherein the at least three detection coils each comprise a plurality of turns that are coaxial.

14. The detection apparatus according to claim 8, further comprising an alarm configured to generate an alarm when the processor determines that a foreign object exists.

15. A wireless charging foreign object detection system, comprising the wireless charging foreign object detection apparatus according to claim 1, and the wireless charging foreign object detection apparatus is configured to detect whether a foreign object exists in the wireless charging system.

16. A foreign object detection method for a wireless charging system, comprising:
   collecting a first induced voltage generated, by a first detection coil, in a time-varying magnetic field generated by an excitation coil;
   collecting a second induced voltage generated, by a second detection coil, in the time-varying magnetic field generated by the excitation coil, wherein respective orthographic projections of the first detection coil, the second detection coil, and the excitation coil are all planar coils and are separated from each other on a same plane, wherein the second detection coil is located between the first detection coil and the excitation coil, the first detection coil is located on an inner side of the second detection coil, and the excitation coil is located on an outer side of the second detection coil;
   determining whether the first induced voltage is equal to the second induced voltage; and
   determining that a foreign object exists if the first and second induced voltages are not equal.

17. The method according to claim 16, wherein a target region in the time-varying magnetic field, in which the first and second detection coils are located, includes a substantially even distribution in magnetic flux density.

18. The method according to claim 16, wherein a product of a quantity of turns of the first detection coil and an area encircled by the first detection coil is equal to a product of a quantity of turns of the second detection coil and an area encircled by the second detection coil.

19. The method according to claim 16, wherein the first detection coil and the second detection coil have different quantities of turns.

20. The method according to claim 16, wherein both the first detection coil and the second detection coil are planar coils, and the first detection coil and the second detection coil are located on a same plane.

* * * * *